(12) United States Patent
Han

(10) Patent No.: US 9,279,654 B2
(45) Date of Patent: Mar. 8, 2016

(54) SYSTEM AND METHOD FOR DETERMINING VEHICLE DOOR AXIS ADJUSTMENT MOUNT

(71) Applicant: Hyundai Motor Company, Seoul (KR)

(72) Inventor: Jinsu Han, Seoul (KR)

(73) Assignee: Hyundai Motor Company, Seoul (KR)

( * ) Notice: Subject to any disclaimer, the term of this patent is extended or adjusted under 35 U.S.C. 154(b) by 277 days.

(21) Appl. No.: 14/089,559

(22) Filed: Nov. 25, 2013

(65) Prior Publication Data

US 2014/0366394 A1 Dec. 18, 2014

(30) Foreign Application Priority Data

Jun. 14, 2013 (KR) .................. 10-2013-0068320

(51) Int. Cl.
*G01B 5/25* (2006.01)

(52) U.S. Cl.
CPC .................................. *G01B 5/25* (2013.01)

(58) Field of Classification Search
CPC ........................................................ G01B 5/25
USPC ............................................................. 33/600
See application file for complete search history.

(56) References Cited

U.S. PATENT DOCUMENTS

| 5,627,767 | A  | * | 5/1997 | Gabiniewicz | ............. G01L 5/22 701/102 |
| 5,641,918 | A  | * | 6/1997 | Odenwald | ........... G01M 99/008 73/862.01 |
| 5,902,941 | A  | * | 5/1999 | Gabiniewicz | ........... G01L 19/00 73/865.6 |
| 6,062,079 | A  | * | 5/2000 | Stewart | .................... G01P 7/00 73/488 |
| 8,558,997 | B2 | * | 10/2013 | Van Esch | ............... G01B 11/14 356/139 |
| 2014/0366394 | A1 | * | 12/2014 | Han | ........................ G01B 5/25 33/600 |

FOREIGN PATENT DOCUMENTS

| JP | 3881828 B2 | 11/2006 |
| KR | 10-0513527 B1 | 9/2005 |
| KR | 10-0892700 B1 | 4/2009 |

* cited by examiner

Primary Examiner — Yaritza Guadalupe-McCall
(74) Attorney, Agent, or Firm — Morgan, Lewis & Bockius LLP

(57) ABSTRACT

A system for determining a vehicle door axis adjustment amount may include a plurality of first setting jigs fixed to a sealing flange of a vehicle body and configured to adjust a position of a door with respect to the vehicle body in a vehicle width direction, a second setting jig configured to support the door and adjust a position of the door with respect to the vehicle body in an up and down direction, and an eccentricity measurement bolt configured to temporarily assemble a door hinge bracket of a door hinge mounted on the vehicle body with the door and measure eccentricity with respect to a hinge bracket bolt hole formed in the door using a gauge.

17 Claims, 9 Drawing Sheets

SYSTEM AND METHOD FOR DETERMINING VEHICLE DOOR AXIS ADJUSTMENT MOUNT

CROSS-REFERENCE TO RELATED APPLICATION

The present application claims priority to Korean Patent Application No. 10-2013-0068320 filed on Jun. 14, 2013, the entire contents of which is incorporated herein for all purposes by this reference.

BACKGROUND OF THE INVENTION

1. Field of the Invention

An exemplary embodiment of the present invention relates to a system and a method for calculating a vehicle door axis adjustment amount, and more particularly, to a system and a method for calculating a vehicle door axis adjustment amount, which allow an adjustment amount of a door axis to be able to be calculated in order to align an axis of a door.

2. Description of Related Art

In general, quality of mounting front and rear doors of a vehicle is a core factor that influences quality of internal and external appearances of the vehicle. In order to improve the quality of mounting the doors, quality enhancement of components and quality enhancement of a door mounting process are simultaneously required. Particularly, in a case in which a rotating axis of a swing type door is twisted, the quality of mounting of all the doors deteriorates, and the following problems may be caused.

That is, in a case in which a rotating axis of a swing type door is twisted, a defect such as gap and height differences of the door in terms of an external appearance occurs, and a portion where a sealing gap between the door and a vehicle body becomes narrow is formed causing the door opening and closing performance to deteriorate.

Further, in the aforementioned case, a portion where the sealing gap between the door and the vehicle body becomes wide is formed such that wind or water may enter therethrough, wind noise due to the gap and height differences of the external appearance occurs when a vehicle travels such that noise vibration performance deteriorates, and a defect due to a level difference between an interior door trim and a crush pad may occur.

Meanwhile, in the door mounting process of the vehicle assembling line, a door hinge is mounted on the vehicle body first using a door hinge mounting jig, and then the door is mounted on the door hinge in a state in which the door is set to the vehicle body using a door assembling jig.

When the operation of setting the door with respect to the vehicle body is completed as described above, a level difference of a skin at an outer side of the door and the sealing gap inside the door are measured, and an adjustment amount of a hinge bracket with respect to a door hinge nut is estimated based on the measured data.

Thereafter, eccentricity of the hinge bracket with respect to the door hinge nut is corrected while moving a position of the hinge bracket by applying the estimated adjustment amount of the hinge bracket to the door assembling jig.

However, as described above, the method for calculating an adjustment amount of the hinge bracket in order to align the axis of the door has a drawback in that an adjustment amount of the hinge bracket may not be directly measured.

Therefore, since the method for calculating an adjustment amount of the hinge bracket needs to estimate an adjustment amount of the hinge bracket based on the data regarding a mounting state of the door, which is obtained by measuring a level difference of a skin at an outer side of the door and the sealing gap inside the door, reliability may deteriorate.

Particularly, since the adjustment of the axis of the front door needs to be performed based on the rear door, the alignment of the axis of the front door may not be accurately confirmed until the adjustment of the axis of the rear door is completed, and as a result, in order to calculate a desired predetermined adjustment amount of the hinge bracket, a number of reconfirmation processes and the same processes need to be repeated.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a system and a method for calculating a vehicle door axis adjustment amount which may directly measure and accurately calculate adjustment amount of a hinge bracket, instead of indirectly estimating an adjustment amount of the hinge bracket with respect to a door hinge nut.

In an aspect of the present invention, a system for determining a vehicle door axis adjustment amount may include a plurality of first setting jigs fixed to a sealing flange of a vehicle body and configured to adjust a position of a door with respect to the vehicle body in a vehicle width direction, a second setting jig configured to support the door and adjust a position of the door with respect to the vehicle body in an up and down direction, and an eccentricity measurement bolt configured to temporarily assemble a door hinge bracket of a door hinge mounted on the vehicle body with the door so as to measure eccentricity with respect to a hinge bracket bolt hole formed in the door using a gauge.

The first setting jigs may include a fixing block having a coupling groove formed at one side of the fixing block and into which the sealing flange is fitted, and first and second engaging holes formed in the fixing block, a fixing bolt coupled to the first engaging hole and configured to engage the sealing flange fitted into the coupling groove, a sealing gap block configured to be in contact with the door and movably installed on the fixing block so as to form a predetermined sealing gap between the sealing flange and the door, and an adjustment bolt inserted into the second engaging hole by passing through a portion of the sealing gap block so as to adjust a position of the sealing gap block with respect to the fixing block.

The sealing gap block may include a block body portion, a first protrusion portion formed to protrude from the block body portion and configured to form the sealing gap between the sealing flange and the door, and a second protrusion portion formed to protrude from the block body portion, coupled to the adjustment bolt, and configured to move a relative position of the sealing gap block when the adjustment bolt is rotated.

A magnet is inserted into the first protrusion portion.

The second setting jig may include a base member, at least a pair of poles installed on the base member in a vertical direction, a screw jack including an adjustment handle and a lifting rod, installed on each of the poles, and configured to move the lifting rod in the up and down direction when the adjustment handle is rotated, and a support plate installed on an upper end portion of the lifting rod and configured to support the door.

The support plate is installed on the upper end portion of the lifting rod so as to be movable in the vehicle width direction.

A slot is formed in the support plate in the vehicle width direction, and a guide bolt is engaged on the upper end portion of the lifting rod, inserted into the slot so as to guide the support plate, and installed to fix the support plate to an upper end portion of the pole.

The eccentricity measurement bolt may include a head portion, and a support pin inserted into the head portion so as to support the door hinge bracket.

A diameter of the head portion is formed to be smaller than a diameter of the hinge bracket bolt hole.

In another aspect of the present invention, a method for determining a vehicle door axis adjustment amount which determines a door axis adjustment amount with respect to a vehicle body in a vehicle door mounting process using the system for determining a door axis adjustment amount, may include (a) fixing the first setting jig on the sealing flange of the vehicle body, adjusting a position of the door with respect to the vehicle body in the up and down direction using the second setting jig, and adjusting a position of the door with respect to the vehicle body in the vehicle width direction using the first setting jig so as to set the door to the vehicle body, (b) mounting a vehicle body hinge bracket of the door hinge on the vehicle body, and temporarily assembling the door hinge bracket of the door hinge with the door using the eccentricity measurement bolt, and (c) measuring an interval between the eccentricity measurement bolt and the door hinge bracket bolt hole using the gauge, and determining an amount of eccentricity of the door hinge bracket on the basis of the bolt hole.

In step (a), the first setting jig may include a fixing block having a coupling groove formed at one side of the fixing block and into which the sealing flange is fitted, and first and second engaging holes formed in the fixing block, a fixing bolt coupled to the first engaging hole and configured to engage the sealing flange fitted into the coupling groove, a sealing gap block configured to be in contact with the door and movably installed on the fixing block so as to form a predetermined sealing gap between the sealing flange and the door, and an adjustment bolt inserted into the second engaging hole by passing through a portion of the sealing gap block so as to adjust a position of the sealing gap block with respect to the fixing block, wherein the sealing gap block may include a block body portion, a first protrusion portion formed to protrude from the block body portion and configured to form the sealing gap between the sealing flange and the door, and a second protrusion portion formed to protrude from the block body portion, coupled to the adjustment bolt, and configured to move a relative position of the sealing gap block when the adjustment bolt is rotated, and the fixing block of the first setting jig is fixed to the sealing flange of the vehicle body by the fixing bolt.

In step (a), the relative position of the sealing gap block of the first setting jig is adjusted using the adjustment bolt so as to form a predetermined sealing gap between the sealing flange and the door.

In step (a), a magnet is inserted into the first protrusion portion, and the door is configured to be attached to the sealing gap block by the magnet.

In step (a), the second setting jig may include a base member, at least a pair of poles installed on the base member in a vertical direction, a screw jack including an adjustment handle and a lifting rod, installed on each of the poles, and configured to move the lifting rod in the up and down direction when the adjustment handle is rotated, and a support plate installed on an upper end portion of the lifting rod and configured to support the door, and a position of the door with respect to the vehicle body is adjusted in the up and down direction using the screw jack of the second setting jig.

In step (a), a slot is formed in the support plate in the vehicle width direction, a guide bolt is engaged on the upper end portion of the lifting rod, inserted into the slot so as to guide the support plate, and installed to fix the support plate to an upper end portion of the pole, and a position of the door with respect to the vehicle body is adjusted in the vehicle width direction using the support plate of the second setting jig.

In step (c), an interval between diameters of a head portion of the eccentricity measurement bolt and the hinge bracket bolt hole is measured using the gauge.

In step (c), an amount of correction for eccentricity of the door hinge bracket is determined based on the amount of the eccentricity of the door hinge bracket, which is measured using the gauge.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
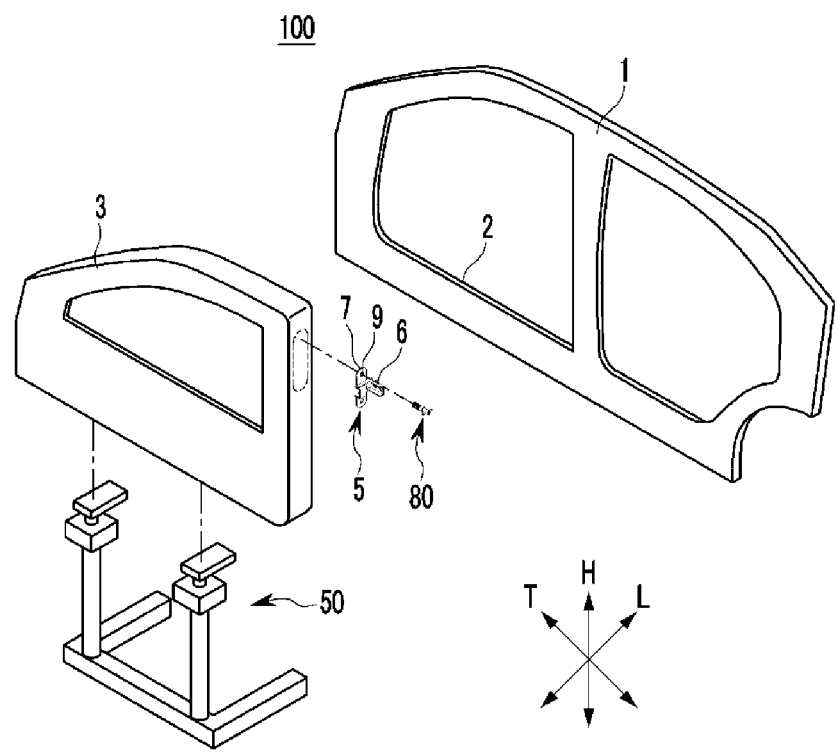
FIG. 1 is a perspective view illustrating a system for calculating a vehicle door axis adjustment amount according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Accordingly, the drawings and description are to be regarded as illustrative in nature and not restrictive. Like reference numerals designate like elements throughout the specification.

The size and thickness of each component illustrated in the drawings are arbitrarily shown for understanding and ease of description, but the present invention is not limited thereto. Thicknesses of several portions and regions are enlarged for clear expressions.

Further, in the following detailed description, names of constituents, which are in the same relationship, are divided into "the first", "the second", and the like, but the present invention is not limited to the order in the following description.

Throughout the specification and the claims, unless explicitly described to the contrary, the word "comprise" and variations such as "comprises" or "comprising" will be understood to imply the inclusion of stated elements but not the exclusion of any other elements.

In addition, "unit", "means", "part", "member", or the like, which is described in the specification, means a unit of a comprehensive configuration that performs at least one function or operation.

Figure 2:
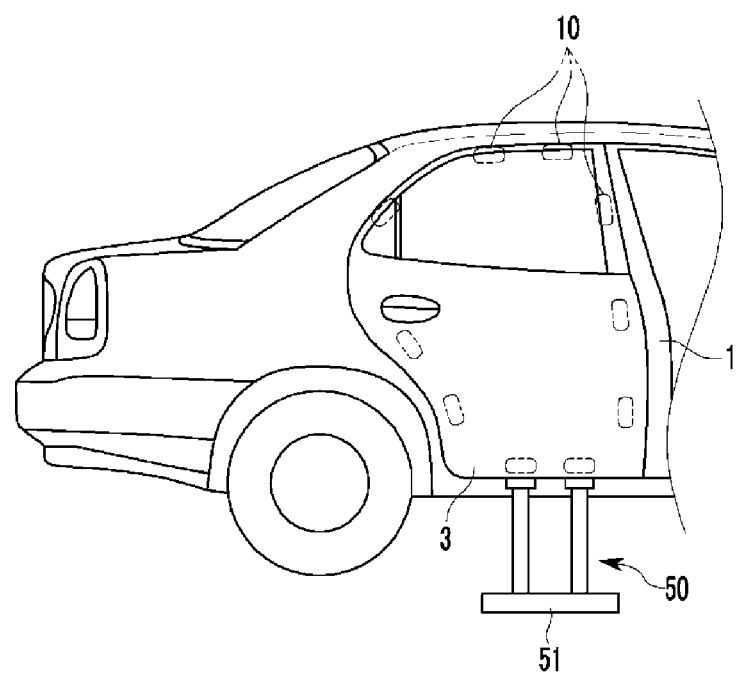
FIG. 2 is a view illustrating an operation in which a door is mounted on a vehicle body using the system for calculating a vehicle door axis adjustment amount according to the exemplary embodiment of the present invention.

FIG. 1 is a view illustrating a configuration of a system for calculating a vehicle door axis adjustment amount according to an exemplary embodiment of the present invention, and FIG. 2 is a view illustrating an operation in which a door is mounted on a vehicle body using the system for calculating a vehicle door axis adjustment amount according to the exemplary embodiment of the present invention.

Referring to FIGS. 1 and 2, a system 100 for calculating a vehicle door axis adjustment amount according to the exemplary embodiment of the present invention may be applied to a vehicle door mounting process of mounting a door 3 at a side panel side of a vehicle body 1.

For example, in the door mounting process, a door hinge 5 is first mounted on the vehicle body 1 using a door hinge mounting jig (not illustrated in the drawing), and then the door 3 may be mounted on the door hinge 5 in which the door 3 is set to the vehicle body 1 using a door assembling jig (not illustrated in the drawing).

Here, the door hinge 5 includes a vehicle body hinge bracket 6 which is mounted on the vehicle body 1, and a door hinge bracket 7 which is hinge-coupled to the vehicle body hinge bracket 6 and of which the door 3 is mounted thereto.

The vehicle body hinge bracket 6 may be engaged at a weld nut (not illustrated in the drawing and also typically called a "hinge nut" in the corresponding business field), which is provided at the vehicle body 1 side, by an engaging bolt (not illustrated in the drawing). Further, the door hinge bracket 7 may be engaged on a door hinge nut (weld nut) 4 (see FIG. 9 hereinafter), which is provided at the door 3 side, by an engaging bolt (not illustrated in the drawing).

In the corresponding business field, a transfer direction of the vehicle body is referred to as a T direction, a width direction of the vehicle body is referred to as an L direction, and a height direction of the vehicle body is referred to as an H direction.

The system 100 for calculating a vehicle door axis adjustment amount according to the exemplary embodiment of the present invention may directly measure and accurately calculate an adjustment amount of the door hinge bracket 7 with respect to the door hinge nut 4 in a state in which the door 3 is set to the vehicle body 1 and the vehicle body hinge bracket 6 of the door hinge 5 is mounted on the vehicle body 1.

The system 100 for calculating a vehicle door axis adjustment amount according to the exemplary embodiment of the present invention basically includes a first setting jig 10, a second setting jig 50, and an eccentricity measurement bolt 80.

Figure 3:
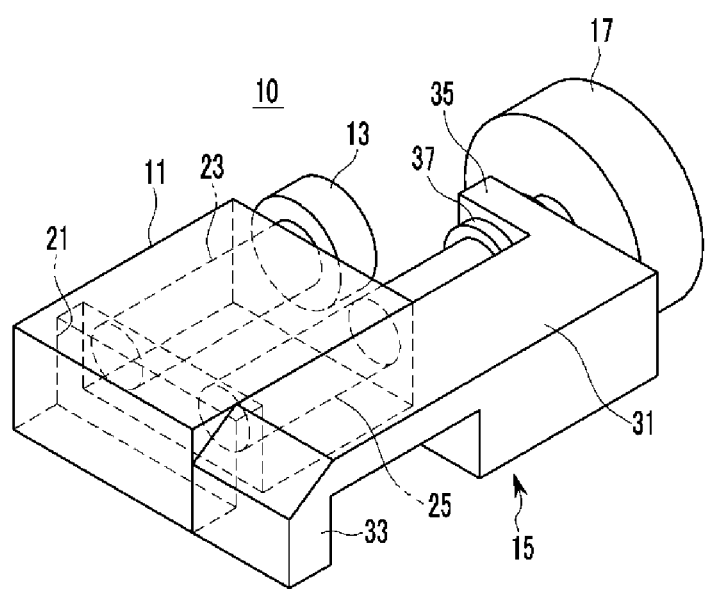
FIG. 3 is a perspective view illustrating a first setting jig that is applied to the system for calculating a vehicle door axis adjustment amount according to the exemplary embodiment of the present invention.
Figure 4:
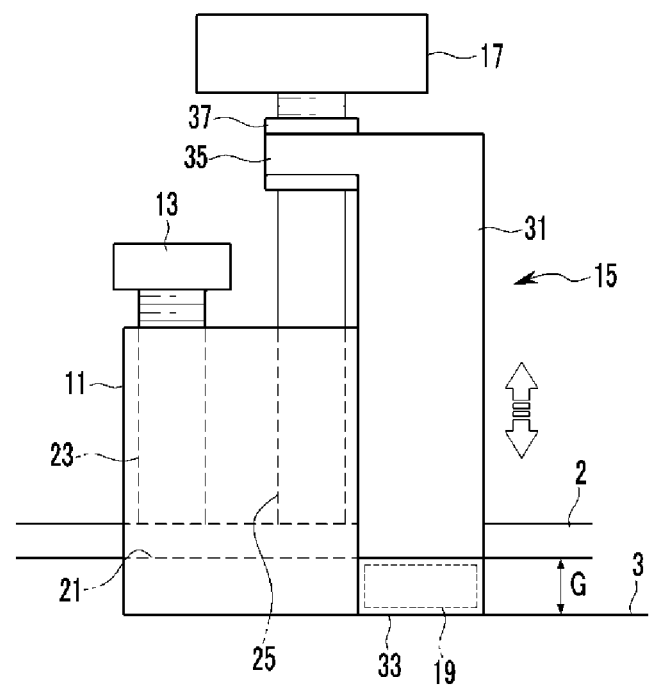
FIG. 4 is a top plan view illustrating the first setting jig that is applied to the system for calculating a vehicle door axis adjustment amount according to the exemplary embodiment of the present invention.
Figure 5:
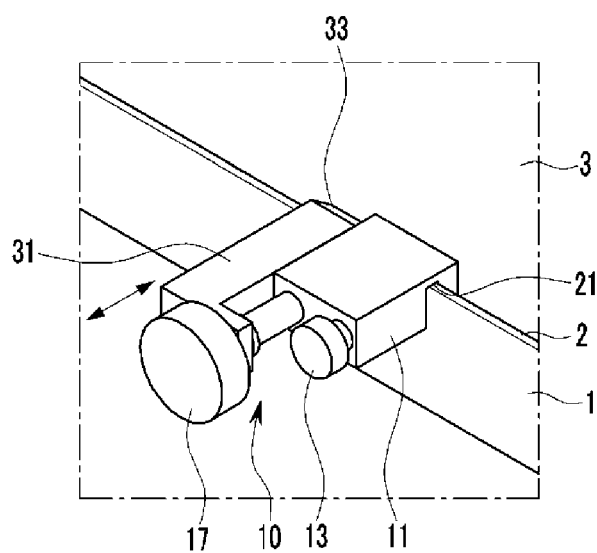
FIG. 5 is a view illustrating an application exemplary embodiment of the first setting jig that is applied to the system for calculating a vehicle door axis adjustment amount according to the exemplary embodiment of the present invention.

FIG. 3 is a perspective view illustrating a first setting jig that is applied to the system for calculating a vehicle door axis adjustment amount according to the exemplary embodiment of the present invention, FIG. 4 is a top plan view of the first setting jig that is applied to the system for calculating a vehicle door axis adjustment amount according to the exemplary embodiment of the present invention, and FIG. 5 is a view illustrating an application exemplary embodiment of the first setting jig that is applied to the system for calculating a vehicle door axis adjustment amount according to the exemplary embodiment of the present invention.

Referring to FIGS. 1 to 5, in the exemplary embodiment of the present invention, a plurality of first setting jigs 10 is fixed to a sealing flange 2 of the vehicle body 1, and serves to adjust a vehicle width-directional position of the door 3 with respect to the vehicle body 1, that is, a sealing gap.

The first setting jig 10 includes a fixing block 11, a fixing bolt 13, a sealing gap block 15, an adjustment bolt 17, and a magnet 19.

A coupling groove 21 into which the sealing flange 2 of the vehicle body 1 is fitted is formed at one side of the fixing block 11. In addition, first and second engaging holes 23 and 25, which are connected to the coupling groove 21, are formed in the fixing block 11, respectively.

Here, the first engaging hole 23 is a bolt hole into which the fixing bolt 13, which will be further described below, is engaged, and the second engaging hole 25 is a bolt hole into which the adjustment bolt 17, which will be further described below, is engaged.

The fixing bolt 13 is provided to fix the fixing block 11 to the sealing flange 2 of the vehicle body 1.

The sealing gap block 15 is provided to form a predetermined sealing gap between the sealing flange 2 of the vehicle body 1 and the door 3, and slidably coupled to the fixing block 11.

Here, when the adjustment bolt 17 is rotated, the sealing gap block 15 is relatively moved so as to form a sealing gap between the sealing flange 2 and the door 3, that is, to align the door 3 with the vehicle body 1 in a vehicle width direction.

The adjustment bolt 17 is rotatably installed in the sealing gap block 15, and may be engaged into the second engaging hole 25.

In this case, the sealing gap block 15 includes a block body portion 31 that is slidably coupled to the fixing block 11. A first protrusion portion 33, which forms a sealing gap between the sealing flange 2 and the door 3, is formed to protrude at one side of the block body portion 31. Further, a second protrusion portion 35 to which the adjustment bolt 17 is rotatably coupled is formed to protrude at the other side of the block body portion 31.

The adjustment bolt 17 may be rotatably installed in the second protrusion portion 35 by a bearing 37.

Meanwhile, the magnet 19 mentioned above is provided to attach an inner side of the door 3 to the sealing gap block 15, and may be installed to be inserted into the first protrusion portion 33 of the sealing gap block 15.

Figure 6:
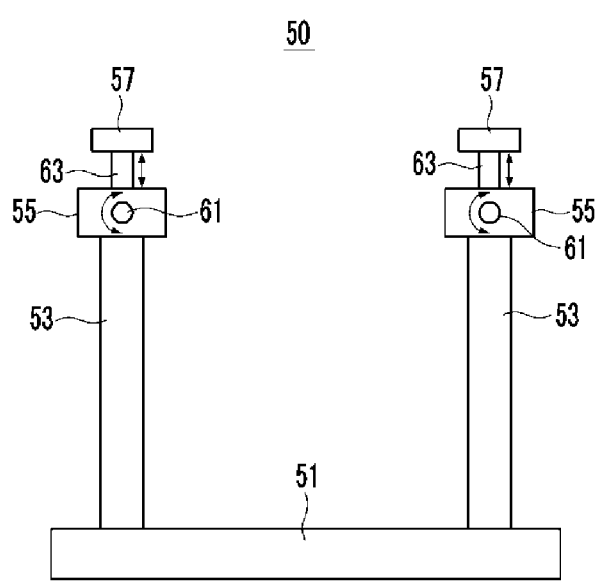
FIG. 6 is a view illustrating a second setting jig that is applied to the system for calculating a vehicle door axis adjustment amount according to the exemplary embodiment of the present invention.
Figure 7:
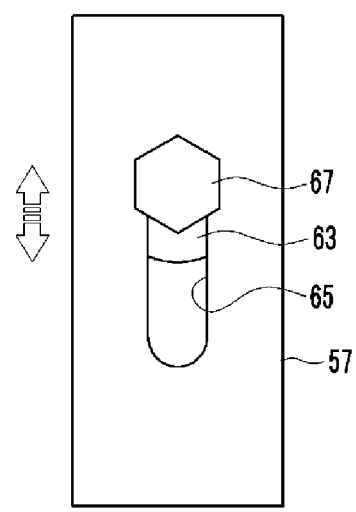
FIG. 7 is a view illustrating a coupling structure of a support plate of the second setting jig that is applied to the system for calculating a vehicle door axis adjustment amount according to the exemplary embodiment of the present invention.

FIG. 6 is a view illustrating a second setting jig that is applied to the system for calculating a vehicle door axis adjustment amount according to the exemplary embodiment of the present invention, and FIG. 7 is a view illustrating a coupling structure of a support plate of the second setting jig that is applied to the system for calculating a vehicle door axis adjustment amount according to the exemplary embodiment of the present invention.

Referring to FIGS. 1, 2, 6, and 7, in the exemplary embodiment of the present invention, the second setting jig 50 supports the door 3, and may adjust a position of the door 3 with respect to the vehicle body 1 in an up and down direction and in the vehicle width direction.

The second setting jig 50 includes a base member 51, poles 53, screw jacks 55, and support plates 57.

The base member 51 is a support frame which supports constituent elements, which will be further described below, and a bolt type leveler (not illustrated in the drawing) for fixing a position of the base member 51 may be installed on the base member 51.

At least one pair of poles 53 is installed on the base member 51 in a vertical direction, and the screw jack 55, which moves a lifting rod 63 in the up and down direction by a rotation of an adjustment handle 61, is installed on an upper end portion of the pole 53.

Because the screw jack 55 is provided as a screw jack apparatus having a typical structure in which torque applied to the adjustment handle 61 is converted into a linear motion of the lifting rod 63 in the up and down direction, a detailed description of the configuration of the screw jack 55 will be omitted in the present specification.

The support plate 57 supports the door 3, and is installed on an upper end portion of the lifting rod 63. Here, the support plate 57 may be installed on the upper end portion of the lifting rod 63 so as to be movable in the vehicle width direction. This is to adjust a position of the door 3 with respect to the vehicle body 1 in the vehicle width direction.

To this end, as illustrated in FIG. 7, a slot 65 is formed in the support plate 57 in the vehicle width direction, and a guide bolt 67 is engaged on the upper end portion of the lifting rod 63 while penetrating the slot 65 of the support plate 57.

Here, the guide bolt 67 serves to guide the support plate 57 in the vehicle width direction, and fix the support plate 57 to the upper end portion of the pole 53.

Figure 8:
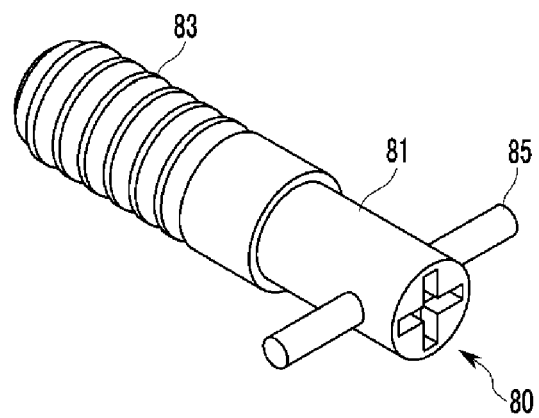
FIG. 8 is a perspective view illustrating an eccentricity measurement bolt that is applied to the system for calculating a vehicle door axis adjustment amount according to the exemplary embodiment of the present invention.

FIG. 8 is a perspective view illustrating the eccentricity measurement bolt that is applied to the system for calculating a vehicle door axis adjustment amount according to the exemplary embodiment of the present invention.

The eccentricity measurement bolt 80 temporarily assembles the door hinge bracket 7 of the door hinge 5, which is mounted at the vehicle body 1 side, with the door 3, and is provided to measure an amount of eccentricity in the vehicle width direction with respect to a bolt hole 9 (see FIGS. 1 and 9 hereinafter) provided in the door hinge bracket 7 using a gauge (not illustrated in the drawing).

Referring to FIGS. 1 and 8, in the exemplary embodiment of the present invention, the eccentricity measurement bolt 80 penetrates the bolt hole 9 of the door hinge bracket 7 of the door hinge 5, and may be temporarily engaged with the hinge nut 4 provided at the door 3 side.

The eccentricity measurement bolt 80 includes a head portion 81, and a stem portion 83 monolithically connected to the head portion 81 and having threads formed thereon. A support pin 85, which supports the door hinge bracket 7, is installed to be inserted into the head portion 81.

Here, a diameter of the head portion 81 of the eccentricity measurement bolt 80 is formed to be smaller than that of the aforementioned bolt hole 9.

Hereinafter, a method for calculating a vehicle door axis adjustment amount using the system 100 for calculating a vehicle door axis adjustment amount according to the exemplary embodiment of the present invention, which is configured as described above, will be described in detail with reference to the above-disclosed drawings and the accompanying drawings.

Figure 9:
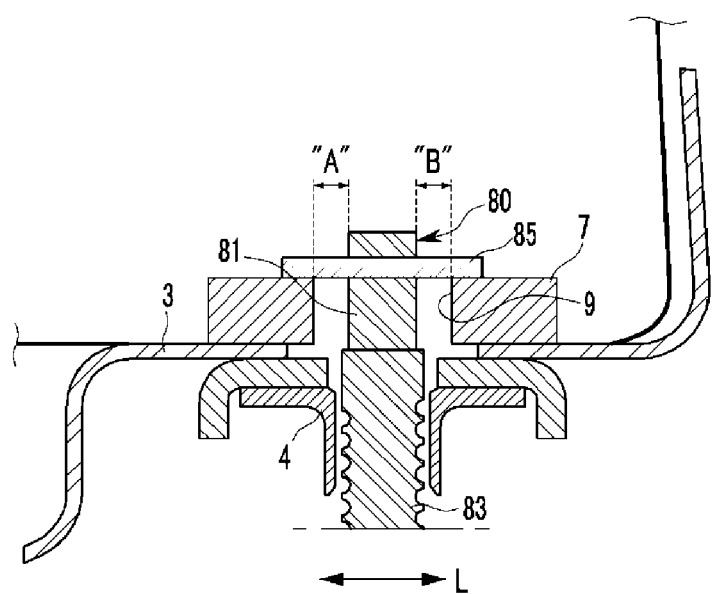
FIG. 9 is a view for explaining a method for calculating a vehicle door axis adjustment amount according to an exemplary embodiment of the present invention.

FIG. 9 is a view for explaining a method for calculating a vehicle door axis adjustment amount according to an exemplary embodiment of the present invention.

Referring to FIGS. 1 to 9, in the exemplary embodiment of the present invention, first, the fixing blocks 11 of the plurality of first setting jigs 10 are fixed to the sealing flange 2 of the vehicle body 1, as illustrated in FIGS. 4 and 5. In this process, the sealing flange 2 of the vehicle body 1 is fitted into the coupling groove 21 of the fixing block 11, and then the fixing bolt 13 is tightened such that the fixing block 11 is fixed to the sealing flange 2 of the vehicle body 1.

Next, as illustrated in FIG. 2, the door 3 is set to the vehicle body 1 in a state in which the door 3 is supported on the support plate 57 of the second setting jig 50.

In this state, in the exemplary embodiment of the present invention, a position of the door 3 with respect to the vehicle body 1 is adjusted in the up and down direction using the screw jack 55 of the second setting jig 50, and a position of the door 3 with respect to the vehicle body 1 is adjusted in the vehicle width direction using the support plate 57.

In this process, as the lifting rod 63 is linearly moved in the up and down direction by rotating the adjustment handle 61 of the screw jack 55, a position in the up and down direction and an angle of the door 3 with respect to the vehicle body 1 may be adjusted.

Further, in this process, the guide bolt 67 is loosened so as to move the support plate 57 in the vehicle width direction, and the guide bolt 67 is tightened so as to adjust a position of the door 3 with respect to the vehicle body 1 in the vehicle width direction.

Furthermore, in the exemplary embodiment of the present invention, a position of the door 3 with respect to the vehicle body 1 may be adjusted in the vehicle width direction using the sealing gap block 15 of the first setting jig 10.

In this case, as illustrated in FIGS. 4 and 5, in a state in which the first protrusion portion 33 of the sealing gap block 15 is positioned in a space between the sealing flange 2 and the door 3, the sealing gap block 15 is moved in the vehicle width direction using the adjustment bolt 17 such that a predetermined sealing gap (a space between the door 3 and the vehicle body 1 in FIG. 5) is formed between the sealing flange 2 and the door 3. That is, a position of the door 3 with respect to the vehicle body 1 may be adjusted in the vehicle width direction through the aforementioned process.

Here, the door 3 may be in close contact with the first protrusion portion 33 of the sealing gap block 15 by the magnet 19 inserted into the first protrusion portion 33 of the sealing gap block 15.

In the exemplary embodiment of the present invention, in a state in which the door 3 is set with respect to the vehicle body 1 through the processes as described above, the vehicle body hinge bracket 6 of the door hinge 5 is mounted on the hinge nut of the vehicle body 1 side using an engaging bolt, and thereafter, the door hinge bracket 7 of the door hinge 5 is engaged on the hinge nut 4 at the door 3 side using the eccentricity measurement bolt 80.

At this time, the stem portion 83 of the eccentricity measurement bolt 80 penetrates the bolt hole 9 of the door hinge bracket 7 so as to be engaged with the door hinge nut 4, and the support pin 85 coupled to the head portion 81 is in a state in which the support pin 85 is supported on the door hinge bracket 7.

In this state, in the exemplary embodiment of the present invention, intervals (indicated by "A" and "B" in the drawing) between the eccentricity measurement bolt 80 and the bolt hole 9 are measured by the gauge (not illustrated in the drawing), and then an amount of eccentricity of the door hinge bracket 7 is calculated.

That is, in the exemplary embodiment of the present invention, the intervals A and B between the eccentricity measurement bolt 80 and the bolt hole 9 may be measured using the gauge (not illustrated in the drawing) on the basis of the head portion 81 of the eccentricity measurement bolt 80.

Thereafter, in the exemplary embodiment of the present invention, an amount of correction for eccentricity of the door hinge bracket 7 may be calculated based upon the amount of eccentricity of the door hinge bracket 7.

Thereafter, the door hinge bracket 7 is moved in a direction opposite to the eccentricity of the door hinge bracket 7 so as to correct deviation in the position of the door hinge bracket 7.

According to the system 100 and the method for calculating a vehicle door axis adjustment amount according to the exemplary embodiment of the present invention, as described above, an adjustment amount of the door hinge bracket 7 with respect to the door hinge nut 4 may be directly measured and accurately calculated using the eccentricity measurement bolt 80 in a state in which the door 3 is set to the vehicle body 1 using the first and second setting jigs 10 and 50 and the vehicle body hinge bracket 6 of the door hinge 5 is mounted on the vehicle body 1.

Accordingly, in the exemplary embodiment of the present invention, instead of indirectly estimating an adjustment amount of the door hinge bracket 7, an adjust amount of the door hinge bracket 7 may be directly measured, and an accurate value may be calculated at once, thereby greatly reducing a loss of man-hours due to an error in calculating an adjustment amount.

In addition, in the exemplary embodiment of the present invention, axes of the front and rear doors may be simultaneously and synthetically adjusted, unlike the related art in which an axis of the front door may be accurately aligned after an axis of the rear door is aligned.

Furthermore, in the exemplary embodiment of the present invention, since a vehicle of which door axes are aligned may be produced at the beginning of developing the vehicle, it is possible to detect in early stages problems such as a difference in force required to open and close the door, wind noise, and level differences of internal and external appearances of the door.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings as well as various alternatives and modifications thereof. It is intended that the scope of the invention be defined by the Claims appended hereto and their equivalents.

What is claimed is:

1. A system for determining a vehicle door axis adjustment amount comprising:
  a plurality of first setting jigs fixed to a sealing flange of a vehicle body and configured to adjust a position of a door with respect to the vehicle body in a vehicle width direction;
  a second setting jig configured to support the door and adjust a position of the door with respect to the vehicle body in an up and down direction; and
  an eccentricity measurement bolt configured to temporarily assemble a door hinge bracket of a door hinge mounted on the vehicle body with the door so as to measure eccentricity with respect to a hinge bracket bolt hole formed in the door using a gauge.

2. The system of claim 1, wherein the first setting jigs include:
  a fixing block having:
    a coupling groove formed at one side of the fixing block and into which the sealing flange is fitted; and
    first and second engaging holes formed in the fixing block;
  a fixing bolt coupled to the first engaging hole and configured to engage the sealing flange fitted into the coupling groove;
  a sealing gap block configured to be in contact with the door and movably installed on the fixing block so as to form a predetermined sealing gap between the sealing flange and the door; and
  an adjustment bolt inserted into the second engaging hole by passing through a portion of the sealing gap block so as to adjust a position of the sealing gap block with respect to the fixing block.

3. The system of claim 2, wherein the sealing gap block includes:
  a block body portion;
  a first protrusion portion formed to protrude from the block body portion and configured to form the sealing gap between the sealing flange and the door; and
  a second protrusion portion formed to protrude from the block body portion, coupled to the adjustment bolt, and configured to move a relative position of the sealing gap block when the adjustment bolt is rotated.

4. The system of claim 3, wherein a magnet is inserted into the first protrusion portion.

5. The system of claim 2, wherein the second setting jig includes:

a base member;

at least a pair of poles installed on the base member in a vertical direction;

a screw jack including an adjustment handle and a lifting rod, installed on each of the poles, and configured to move the lifting rod in the up and down direction when the adjustment handle is rotated; and a support plate installed on an upper end portion of the lifting rod and configured to support the door.

6. The system of claim 5, wherein the support plate is installed on the upper end portion of the lifting rod so as to be movable in the vehicle width direction.

7. The system of claim 6, wherein a slot is formed in the support plate in the vehicle width direction, and wherein a guide bolt is engaged on the upper end portion of the lifting rod, inserted into the slot so as to guide the support plate, and installed to fix the support plate to an upper end portion of the pole.

8. The system of claim 1, wherein the eccentricity measurement bolt includes a head portion, and a support pin inserted into the head portion so as to support the door hinge bracket.

9. The system of claim 8, wherein a diameter of the head portion is formed to be smaller than a diameter of the hinge bracket bolt hole.

10. A method for determining a vehicle door axis adjustment amount which determines a door axis adjustment amount with respect to a vehicle body in a vehicle door mounting process using the system for determining a door axis adjustment amount of claim 1, the method comprising:

(a) fixing the first setting jig on the sealing flange of the vehicle body, adjusting a position of the door with respect to the vehicle body in the up and down direction using the second setting jig, and adjusting a position of the door with respect to the vehicle body in the vehicle width direction using the first setting jig so as to set the door to the vehicle body;

(b) mounting a vehicle body hinge bracket of the door hinge on the vehicle body, and temporarily assembling the door hinge bracket of the door hinge with the door using the eccentricity measurement bolt; and (c) measuring an interval between the eccentricity measurement bolt and the door hinge bracket bolt hole using the gauge, and determining an amount of eccentricity of the door hinge bracket on the basis of the bolt hole.

11. The method of claim 10, wherein in step (a), the first setting jig includes:

a fixing block having a coupling groove formed at one side of the fixing block and into which the sealing flange is fitted, and first and second engaging holes formed in the fixing block;

a fixing bolt coupled to the first engaging hole and configured to engage the sealing flange fitted into the coupling groove;

a sealing gap block configured to be in contact with the door and movably installed on the fixing block so as to form a predetermined sealing gap between the sealing flange and the door; and an adjustment bolt inserted into the second engaging hole by passing through a portion of the sealing gap block so as to adjust a position of the sealing gap block with respect to the fixing block, wherein the sealing gap block includes:

a block body portion;

a first protrusion portion formed to protrude from the block body portion and configured to form the sealing gap between the sealing flange and the door; and a second protrusion portion formed to protrude from the block body portion, coupled to the adjustment bolt, and configured to move a relative position of the sealing gap block when the adjustment bolt is rotated, and the fixing block of the first setting jig is fixed to the sealing flange of the vehicle body by the fixing bolt.

12. The method of claim 11, wherein in step (a), the relative position of the sealing gap block of the first setting jig is adjusted using the adjustment bolt so as to form a predetermined sealing gap between the sealing flange and the door.

13. The method of claim 11, wherein in step (a), a magnet is inserted into the first protrusion portion, and the door is configured to be attached to the sealing gap block by the magnet.

14. The method of claim 10, wherein in step (a), the second setting jig includes:

a base member;

at least a pair of poles installed on the base member in a vertical direction;

a screw jack including an adjustment handle and a lifting rod, installed on each of the poles, and configured to move the lifting rod in the up and down direction when the adjustment handle is rotated; and a support plate installed on an upper end portion of the lifting rod and configured to support the door, and a position of the door with respect to the vehicle body is adjusted in the up and down direction using the screw jack of the second setting jig.

15. The method of claim 14, wherein in step (a), a slot is formed in the support plate in the vehicle width direction, a guide bolt is engaged on the upper end portion of the lifting rod, inserted into the slot so as to guide the support plate, and installed to fix the support plate to an upper end portion of the pole, and a position of the door with respect to the vehicle body is adjusted in the vehicle width direction using the support plate of the second setting jig.

16. The method of claim 10, wherein in step (c), an interval between diameters of a head portion of the eccentricity measurement bolt and the hinge bracket bolt hole is measured using the gauge.

17. The method of claim 16, wherein in step (c), an amount of correction for eccentricity of the door hinge bracket is determined based on the amount of the eccentricity of the door hinge bracket, which is measured using the gauge.

* * * * *